United States Patent [19]
Cox et al.

[11] 3,927,379
[45] Dec. 16, 1975

[54] LINEAR AMPLIFICATION USING NONLINEAR DEVICES AND INVERSE SINE PHASE MODULATION

[75] Inventors: Donald Clyde Cox, New Shrewsbury; Rollin Edward Langseth, Colts Neck; Douglas Otto John Reudink, Sea Girt; Anthony Joseph Rustako, Jr., Colts Neck, all of N.J.

[73] Assignee: Bell Telephone Laboratories, Incorporated, Murray Hill, N.J.

[22] Filed: Jan. 8, 1975

[21] Appl. No.: 539,263

[52] U.S. Cl. ................ 330/10; 330/124 R; 330/149
[51] Int. Cl.$^2$ ............................................ H03F 3/38
[58] Field of Search .......... 330/10, 116, 117, 124 R, 330/149

[56] References Cited

UNITED STATES PATENTS

| | | | |
|---|---|---|---|
| 3,777,275 | 12/1973 | Cox | 330/10 |
| 3,873,936 | 3/1975 | Cho | 330/124 R |

*Primary Examiner*—R. V. Rolinec
*Assistant Examiner*—Lawrence J. Dahl
*Attorney, Agent, or Firm*—Daniel D. Dubosky

[57] ABSTRACT

A linear amplification providing a replica of an input signal having amplitude variations is accomplished at frequencies and power levels for which linear gain elements are not available. Linear amplification is provided by separating an original bandpass input signal into two components, one of which is a constant amplitude sinusoidal component and the other of which is a low-pass envelope signal. The envelope signal is processed to produce both an inverse sine, phase modulated signal and the complex conjugate of the modulated signal. The phase variations of the modulated signal and of its complex conjugate are proportional to the inverse sine of the envelope. The modulated signal and its complex conjugate are each separately mixed with the constant amplitude sinusoidal signal to produce two constant amplitude signals which are filtered and amplified by either linear or nonlinear devices. The amplified filtered resultants are combined to produce a linearly amplified replica of the original bandpass input signal.

7 Claims, 6 Drawing Figures

LINEAR AMPLIFICATION USING NONLINEAR DEVICES AND INVERSE SINE PHASE MODULATION

BACKGROUND OF THE INVENTION

This invention relates to amplification circuits, and more particularly to circuits for providing linear bandpass amplification of high frequency, amplitude varying signals. Alternative arrangements for this purpose form the subject matter of U.S. Pat. No. 3,777,275 assigned to the assignee of this application.

In many communication applications a linear power amplifier is required because the signal to be amplified contains amplitude variations and a nonlinear device would cause undesirable distortion of the desired signal. Such systems include those utilizing standard AM transmission and those using more complex amplitude varying signals, such as ones having single sideband modulation or frequency multiplexed sets of separately modulated low-level carriers, both of which contain a composite of amplitude and phase fluctuations.

Unfortunately, solid-state linear power amplifiers are difficult to build for microwave and millimeter wave frequencies in the 6 to 100 GHz range, and at lower frequencies such as 1 to 6 GHz high power linear devices are often unavailable or very expensive.

Conversely, nonlinear solid-state power amplifiers are readily available at microwave frequencies such as 1 or 2 GHz, and constant amplitude phase lockable signal sources (GUNN and IMPATT diodes) are available in the 2 to 100 GHz microwave and millimeter wave range. For high power applications in the 0.1 to 10 GHz range, nonlinear electron tube amplifiers and power oscillators are substantially less costly than are linear devices.

It is an object of the present invention to provide linear amplification of amplitude varying analog signals at microwave and millimeter wave frequencies, especially above 1 GHz, by using only available state of the art circuit components including nonlinear amplifying devices. It is also an object of the present invention to utilize the same principles to provide linear amplification suitable for high power applications at lower frequencies.

SUMMARY OF THE INVENTION

In accordance with the present invention, the bandpass input signal which may have both amplitude and phase variations is separated into a constant amplitude component containing information in phase variations and an envelope signal containing information in amplitude variations. An inverse sine phase modulator is used to modulate a sinusoidal reference signal with the envelope signal to produce a sinusoidal output signal whose frequency is the same as the frequency of the sinusoidal reference signal but whose phase is shifted by an amount proportional to the inverse sine of the envelope signal. The complex conjugate of the modulator output signal is generated. The complex conjugate and the constant amplitude component are multiplied by a first mixer to produce a first mixed output. The inverse sine phase modulator output signal and the constant amplitude component are multiplied by a second mixer to produce a second mixed output. Each of the two mixed outputs is separately filtered and each filtered resultant is separately amplified by either linear or nonlinear devices. The amplified filtered resultants are combined to produce a linearly amplified replica of the original bandpass input signal.

DETAILED DESCRIPTION

Figure 1:
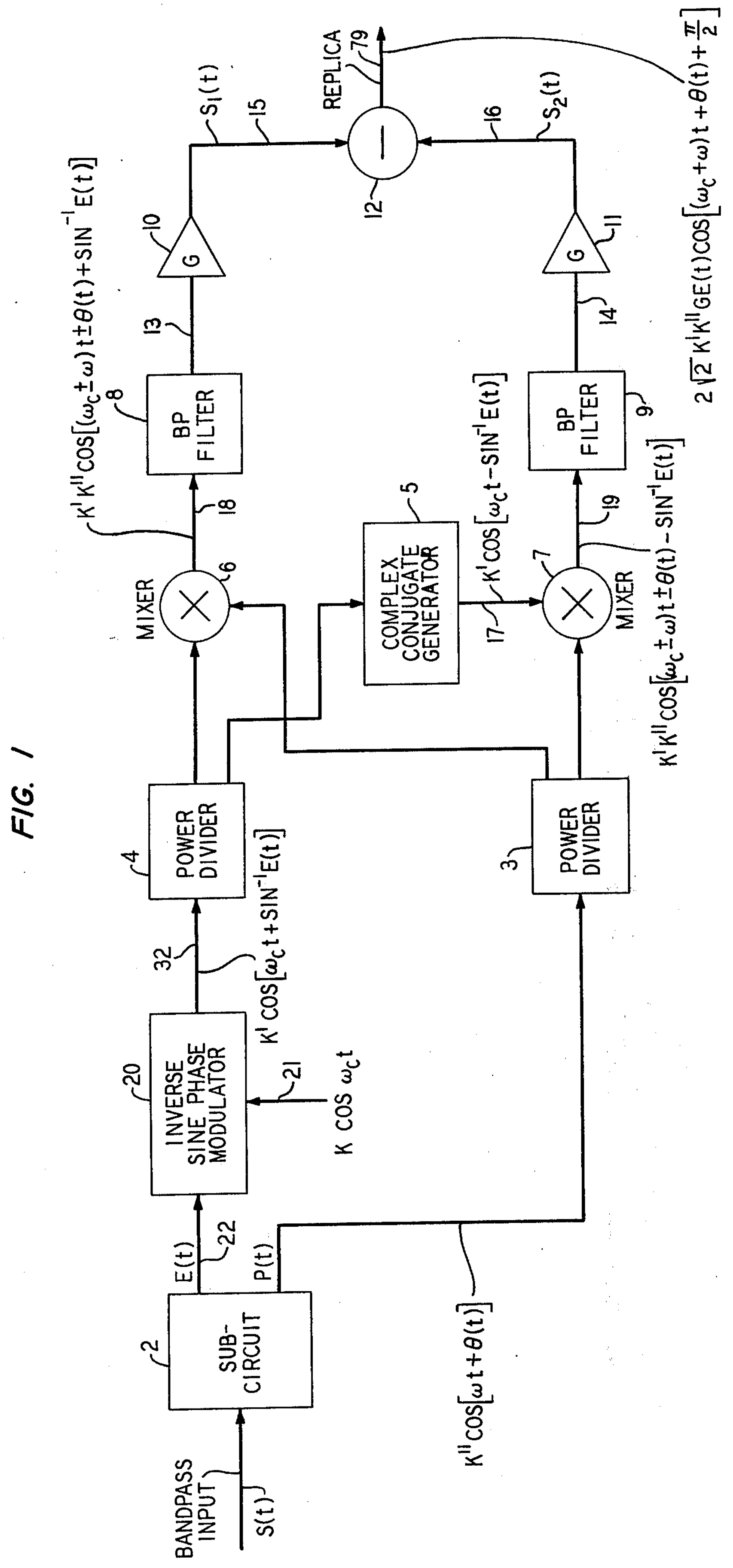
FIG. 1 is a generalized block diagram of a LIND (linear amplification with nonlinear devices) amplifier circuit in accordance with the present invention.

The invention may be best understood by reference to FIG. 1. A bandpass input signal $S(t)$ of the form $E(t)\text{COS}[\omega t+\theta(t)]$ with information contained in envelope (amplitude) variations $E(t)$ and in phase fluctuations $\theta(t)$ is applied to subcircuit 2. The subcircuit separates the bandpass input signal into the envelope signal $E(t)$ on lead 22 and a constant amplitude component $p(t)$ of the form $K''\text{COS}[\omega t+\theta(t)]$ where $K''$ is a constant and $\theta(t)$ is the phase information.

The envelope signal $E(t)$ and a constant amplitude sinusoidal reference signal $K\,\text{COS}\omega_c t$ are applied to an inverse sine phase modulator 20 via leads 22 and 21 respectively. The inverse sine phase modulator, details of which will be discussed hereinafter, produces on lead 32 an output signal of the fork $K'\text{COS}[\omega_c t+\text{SIN}^{-1}E(t)]$ where $K'$ is a constant and $\omega_c$ is a radian reference frequency. The phase of the output signal on lead 32 differs from the phase of the sinusoidal reference signal on lead 21 by an amount proportional to the inverse SINE of the envelope $E(t)$. This output signal is applied to a power divider 4 which produces two equal outputs of the form $K'\text{COS}[\omega_c t+\text{SIN}^{-1}E(t)]$. One of these two equal outputs is applied to complex conjugate generator 5 which produces a conjugate signal of the form $K'\text{COS}[\omega_c t-\text{SIN}^{-1}E(t)]$ on lead 17.

The constant amplitude component $p(t)$ from subcircuit 2 is applied to power divider 3 which produces two equal outputs of the form $K''\text{COS}[\omega t+\theta(t)]$. One output from each power divider is applied to mixer 6 which produces as its output a signal of the form $K'K''\text{COS}[(\omega_c\pm\omega)t\pm\theta(t)+\text{SIN}^{-1}E(t)]$ on lead 18. The conjugate signal $K'\text{COS}[\omega_c t-\text{SIN}^{-1}E(t)]$ on lead 17 and the other output from power divider 3 are applied to mixer 7 which produces as its output a signal of the form $K'K''\text{COS}[(\omega_c\pm\omega)t\pm\theta(t)-\text{SIN}^{-1}E(t)]$ on lead 19.

The outputs of mixers 6 and 7 are applied to bandpass filters 8 and 9 respectively to produce signals of the form $K'K''\text{COS}[(\omega_c+\omega)t+\theta(t)+\text{SIN}^{-1}E(t)]$ and $K'K'\text{COS}[(\omega_c+\omega)t+\theta(t)-\text{SIN}^{-1}E(t)]$ on leads 13 and 14 respectively. The outputs of bandpass filters 8 and 9 are applied respectively to amplifiers 10 and 11, each of gain $G$, to produce signals $S_1(t)$ of the form $K'K''G\text{-COS}[(\omega_c+\omega)t+\theta(t)+\text{SIN}^{-1}E(t)]$ and $S_2(t)$ of the form $K'K''G\ \text{COS}[(\omega_c+\omega)t+\theta(t)-\text{SIN}^{-1}E(t)]$ on leads 15 and 16 respectively. Amplifiers 10 and 11 may be matched linear or matched nonlinear devices. If they are linear devices the position of either amplifier and its associated band-pass filter may be interchanged without affecting the operation of the LIND (linear amplification with nonlinear devices) amplifier. If, however, amplifiers 10 and 11 are nonlinear devices, their position in the LIND amplifier cannot be changed. The filtered amplified outputs on leads 15 and 16 are applied to combining device 12, which may be a hybrid combiner or magic tee device, producing as its output a linearly amplified frequency shifted replica of the original bandpass input signal. This replica is of the general form. $2\sqrt{2}\ K'K''G\ E(t)\mathrm{COS}[(\omega_c+\omega)t+\theta(t)+\pi/2]$.

Throughout the detailed description for mathematical simplicity, the gain of power dividers 3 and 4 is chosen to be equal to $\sqrt{2}$ and the gains of complex conjugate generator 5, mixers 6 and 7, and bandpass filters 8 and 9 are each chosen to be equal to unity.

Figure 2:
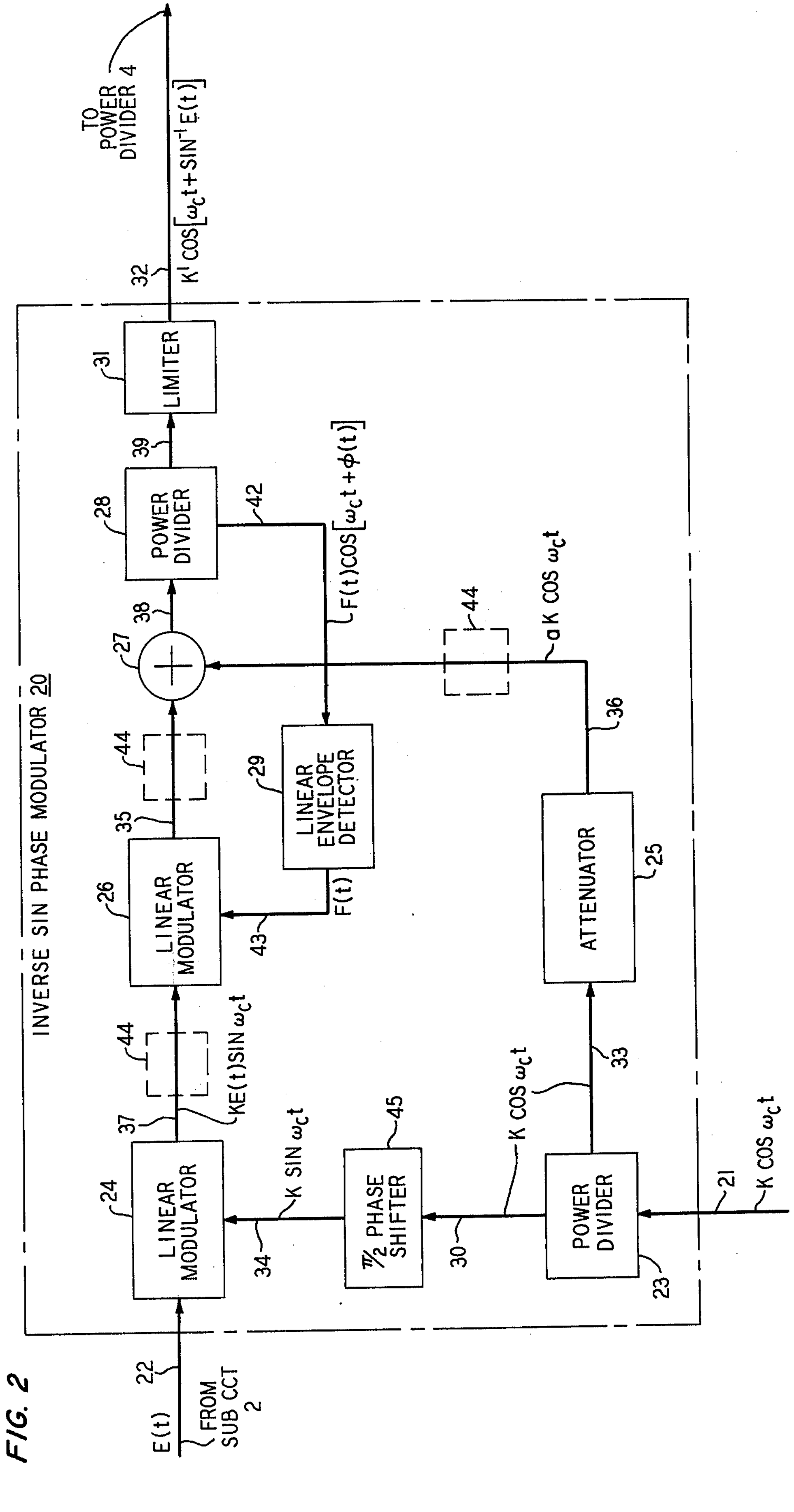
FIG. 2 is a generalized block diagram of a novel inverse sine phase modulator suitable for use in the amplifier circuit of FIG. 1.

FIG. 2 shows the detailed structure of inverse sine phase modulator 20 of FIG. 1. The envelope signal $E(t)$ is applied via lead 22 to linear modulator 24 and the reference sinusoidal signal $K\,\mathrm{COS}\omega_c t$ is applied via lead 21 to power divider 23 which produces as its outputs two sinusoidal reference signals for the form $K\,\mathrm{COS}\omega_c t$ on leads 30 and 33. The reference signal on lead 33 is applied to attenuator 25 to produce a reference signal $aK\,\mathrm{COS}\omega_c t$ on lead 36. Attenuator 25 is set to provide $aK=1$. The reference signal $K\,\mathrm{COS}\omega_c t$ on lead 30 is applied to phase shifter 45 which produces as its output a reference signal $K\,\mathrm{SIN}\omega_c t$ on lead 34. The reference signal $K\,\mathrm{SIN}\omega_c t$ on lead 34 is linearly modulated by the envelope signal $E(t)$ in a double balanced linear modulator 24, which may be, for example, an MD-141 modulator made by ANZAC Electronics of Waltham, Mass., producing as its output on lead 37 a signal of the form $K\,E(t)\mathrm{SIN}\omega_c t$. The output signal on lead 37 is linearly modulated in modulator 26 by a feedback signal $F(t)$ derived from the inverse sine phase modulator output before limiting. Modulator 26 may comprise, for example, a Siliconix U 350 quad field effect transistor. The output of modulator 26 is a signal of the form $K'''F(t)E(t)\mathrm{SIN}\omega_c t$ on lead 35. The gain of modulator 26 is set to provide $[K'''E(t)]^2<1$. The signal on lead 35 and the sinusoidal reference signal $aK\,\mathrm{COS}\omega_c t$ on lead 36 are applied as inputs to summer 27 which produces as its output on lead 38 a signal of the form $F(t)\mathrm{COS}[\omega_c t+\phi(t)]$. The two inputs to this power combiner should be in exact phase quadrature. Accordingly, the length of leads, 30, 33, 34 35, 36 and 37 are chosen so that the signals on leads 35 and 36 are in phase quadrature. An appropriate phase shifter 44 sketched in phantom may be inserted in any of the locations indicated in FIG. 2 to assure that the two input signals to summer 27 are in phase quadrature. The resulting signal envelope on lead 38 is the square root of the sum of the squares of the envelopes of the signals on leads 35 and 36. Assuming $aK$ equals unity, the envelope of the signal on lead 38 is equal to $\sqrt{1+[K'''E(t)F(t)]^2}$. Power divider 28 has a gain of $\sqrt{2}$ and produces two equal output signals of the form $F(t)\mathrm{COS}[\omega_c t+\phi(t)]$ on leads 39 and 42. Since $F(t)$ is defined as the envelope of the signal on lead 38, it follows that the output $F(t)$ of linear envelope detector 29 is given by $$F(t) = \sqrt{1+[K'''E(t)F(t)]^2} \qquad (1)$$

on lead 43.

Figure 4:
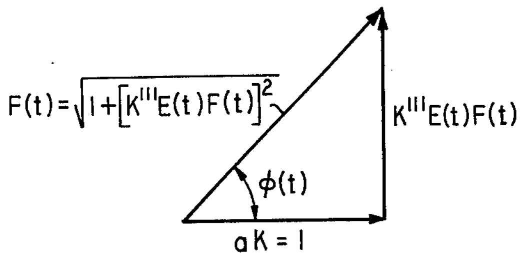
FIG. 4 is a vector diagram showing the relationships between the input signals to and the output signal from the power combiner of the inverse sine phase modulator.

As shown in FIG. 4, $F(t)$ is the magnitude of the vector resulting from the addition of the vector components on leads 35 and 36 which are in phase quadrature. Two vectors in quadrature are shown. One vector represents the signal $aK\,\mathrm{COS}\omega_c t$ on lead 36 where $aK=1$. The other vector represents the signal $K''\lambda' E(t)F(t)\mathrm{SIN}\omega_c t$ on lead 35. Solving equation (1) for $F(t)$, $$F(t) = \frac{1}{\sqrt{1-[K'''E(t)]^2}}. \qquad (2)$$

The output phase $\phi(t)$ of the signal on lead 39 relative to the reference signal $K\,\mathrm{COS}\omega_c t$ is given by the inverse tangent of the ratio of the magnitudes of the two input signals to power combiner 27. Again with $aK$ equal to unity the phase of the signal on lead 39 relative to the phase of the reference signal is $$\phi(t) = \mathrm{TAN}^{-1}\frac{[K'''E(t)F(t)]}{1}. \qquad (3)$$

Substituting equation (2) into equation (3), $$\phi(t) = \mathrm{TAN}^{-1}\frac{K'''E(t)}{\sqrt{1-[K'''E(t)]^2}}. \qquad (4)$$

Using the trigonometric identity $$\mathrm{SIN}^{-1}x = \mathrm{TAN}^{-1}\frac{x}{\sqrt{1-x^2}}, \qquad (5)$$

the relative phase on lead 39 is $$\phi(t) = \mathrm{SIN}^{-1}[K'''E(t)]. \qquad (6)$$

The output signal on lead 39 is therefore given by $F(t)\mathrm{COS}[\omega_c t + \mathrm{SIN}^{-1} E(t)]$. The signal on lead 39 is envelope detected by detector 29 to provide the required signal $F(t)$ to linear modulator 26, and limited by limiter 31 to provide a constant envelope output signal on lead 32 of the form $K'\mathrm{COS}[\omega_c t+\phi(t)]$, where $\phi(t) = \mathrm{SIN}^{-1}E(t)$.

Throughout the detailed description the gain of power dividers 23 and 28 is chosen to be equal to $\sqrt{2}$ for mathematical simplicity. The gain of linear modulator 24 is chosen to be equal to unity.

Figure 3:
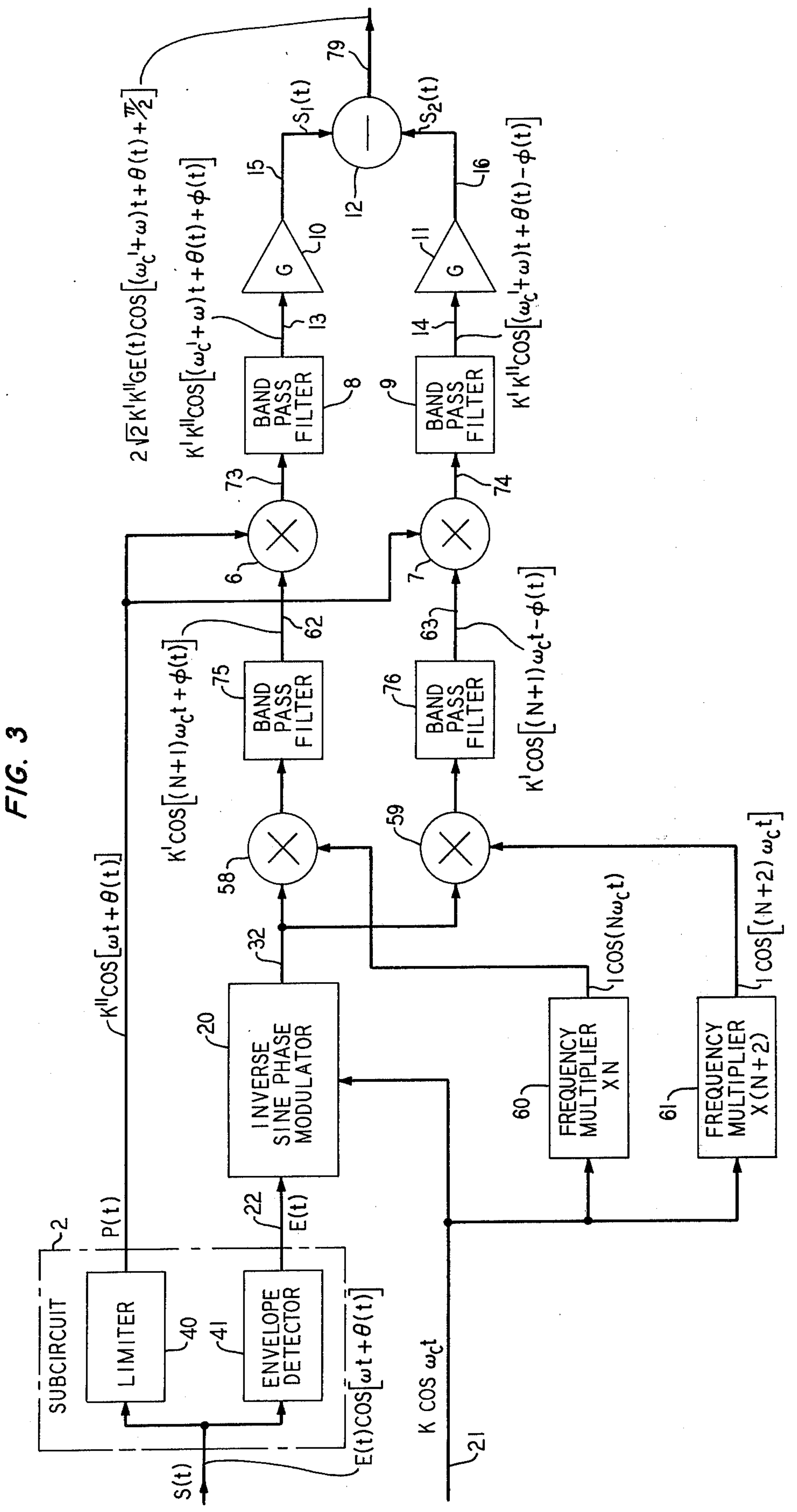
FIG. 3 is a detailed block diagram of one embodiment of FIG. 1.

FIG. 3 is more detailed representation of the embodiment of FIG. 1. The original bandpass input signal $S(t)$ of the form $E(t)\mathrm{COS}[\omega t+\theta(t)]$ containing information in the envelope $E(t)$ and information in phase variations $\theta(t)$ is applied to subcircuit 2. The subcircuit separates the envelope signal $E(t)$ and phase component $p(t)$ by passing the original bandpass input signal through a limiter 40 to obtain a constant envelope signal $p(t)$ containing information in phase variations $\theta(t)$ and through an envelope detector 41 to obtain the envelope information $E(t)$. The envelope $E(t)$ and a sinusoidal reference signal $K\,\mathrm{COS}\omega_c t$ on lead 21 are processed by inverse sine phase modulator 20 to produce an output signal on lead 32 whose frequency is the same as the frequency of the sinusoidal reference signal but whose phase differs from the phase of the sinusoidal reference signal by an amount proportional to the inverse sine of the envelope $E(t)$.

The output signal on lead 32 is split to provide inputs to two mixers 58 and 59. A mixer is a device whose output is the product of its input signals. The remaining inputs to mixers 58 and 59 are derived by frequency multiplying the reference signal $K\ \mathrm{COS}\omega_c t$ in multipliers 60 and 61, respectively. The frequency multiplied input signal to mixer 58 has a radian frequency which is a multiple $N\omega_c$ of the radian frequency reference signal $K\ \mathrm{COS}\omega_c t$ where $N = 1,2,3 \ldots$. The output of mixer 58 at a radian frequency $(N+1)\omega_c$ is bandpass filtered by filter 75 to eliminate unwanted products to provide a signal on lead 62 of the form $KK'\mathrm{COS}[(N+1)\omega_c t + \phi(t)]$. The frequency multiplied input signal to mixer 59 is at any radian frequency multiple $(N+2)\omega_c$ of the radian frequency of the reference signal $K\ \mathrm{COS}\omega_c t$ where $N$ is the same $N$ used in frequency multiplier 60. The output from mixer 59 at a frequency $(N+1)\omega_c$ is bandpass filtered by filter 76 to eliminate unwanted products to provide a signal on lead 63 of the form $KK'\mathrm{COS}[(N+1)_c t - \phi(t)]$. The bandpass filtered outputs on leads 62 and 63 are a phase conjugate pair of signals each of which has a constant envelope and a common radian frequency $(N+1)\omega_c$ shifted by inverse sine phase modulation.

The gain of mixers 58 and 59 and filters 75 and 76 are chosen to be unity for mathematical simplicity. The amplitudes of the outputs of frequency multipliers 60 and 61 are normalized to unity.

The signals on leads 62 and 63 are mixed in mixers 6 and 7 respectively with the constant envelope output of limiter 40 which contains phase information $\theta(t)$ of the original input signal.

The mixed outputs on leads 73 and 74 each contain sum radian frequency and difference radian frequency mixing products. The signals on leads 73 and 74 are applied to bandpass filters 8 and 9 respectively, which filters may be either designed to pass the sum radian frequencies and reject the difference frequencies or designed to pass the difference radian frequencies and reject the sum radian frequencies, depending on the desired filter output radian frequency on leads 13 and 14. The radian frequency on leads 13 and 14 is the desired output radian frequency of the LIND amplifier on lead 79.

For convenience, the mathematical analysis which follows pertains to the case where bandpass filters 8 and 9 pass the sum radian frequency components and reject the difference radian frequency components. A similar mathematical analysis can be made for the case where filters 8 and 9 pass the difference radian frequency components and reject the sum radian frequency components.

The sum frequency signal on lead 13 is given by $$K'K''\mathrm{COS}[(\omega_c'+\omega)t + \theta(t) + \phi(t)] \text{ where } \omega_c' = (N+1)\omega_c. \tag{7}$$

The sum frequency on lead 14 is given by $$K'K''\mathrm{COS}[(\omega_c'+\omega)t + \theta(t) - \phi(t)] \text{ with } \omega_c' = (N+1)\omega_c. \tag{8}$$

The output signals on leads 13 and 14 from bandpass filters 8 and 9 each have a constant envelope, are at a common radian frequency $(\omega_c'+\omega)$, contain the common phase information $\theta(t)$, and form a pair of conjugate phase signals in $\phi(t)$. Amplifiers 10 and 11 each of gain $G$ must be identical linear or identical nonlinear nondispersive amplifiers. A nondispersive amplifier is one having identical time delay across the amplifier bandwidth. The outputs on leads 15 and 16 from amplifiers 10 and 11 are combined together in power combiner 12. The signals on leads 15 and 16 to power combiner 12 are of the form $$S_1(t) = K'K''G\ \mathrm{COS}[(\omega_c'+\omega)t + \theta(t) + \phi(t)] \tag{9}$$

and $$S_2(t) = K'K''\ G\ \mathrm{COS}[(\omega_c'+\omega)t + \theta(t) - \phi(t)]. \tag{10}$$

where $\omega_c' = (N+1)\omega_c$. If combiner 12 subtracts $S_2(t)$ from $S_1(t)$, it produces an output which can be written as $$K'K''G\ \mathrm{COS}[(\omega_c'+\omega)t + \theta(t) + \phi(t)] - K'K''\ G\ \mathrm{COS}[(\omega_c'+\omega)t + \theta(t) - \phi(t)]. \tag{11}$$

Using the trigonometric identity $\mathrm{COS}\alpha - \mathrm{COS}\beta = -2\mathrm{SIN}\tfrac{1}{2}(\alpha+\beta) \cdot \mathrm{SIN}\tfrac{1}{2}(\alpha-\beta)$, (12)

and the fact that $\phi(t) = \mathrm{SIN}^{-1}[E(t)]$, the output on lead 79 of combiner 12 is given by $$-2\sqrt{2}\,K'K''\ GE(t)\ \mathrm{SIN}[(\omega_c'+\omega)t+\theta(t)] = 2\sqrt{2}\ K'K''\ GE(t)\ \mathrm{COS}[(\omega_c'+\omega)t+\theta(t)+\pi/2]. \tag{13}$$

This output is an amplified frequency shifted replica of the original input signal $S(t)$.

Figure 5:
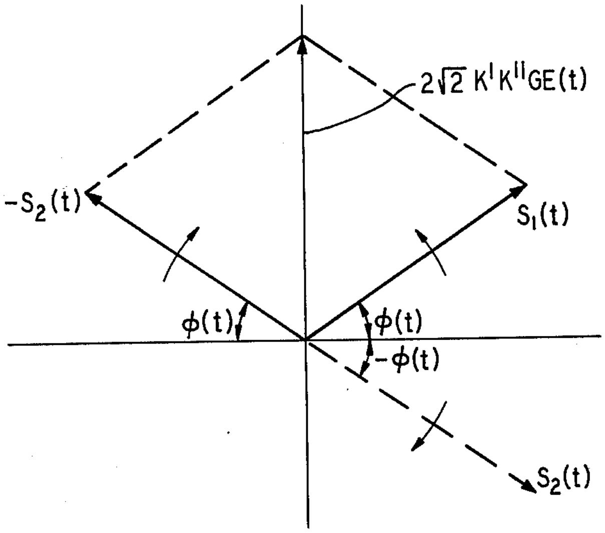
FIGS. 5 and 6 are diagrams showing the phase and magnitude relationships between signal components at the final combiner for various input signals.

FIG. 5 is a diagram showing the phase relationship between the phase modulation terms $\phi(t)$ contained in $S_1(t)$ and $S_2(t)$ at any instant of time. Holding $\theta(t)$ equal to zero where $\theta(t)$ is the phase variation in the original input signal $E(t)\ \mathrm{COS}[\omega t + \theta(t)]$ to be amplified, the signals $S_1(t)$ and $S_2(t)$ can be represented as two constant magnitude vectors rotating in opposite directions with respect to the carrier phase $\omega t$. Each vector is at an angle $\pm\phi(t)$ from the reference position where $\phi(t)$, the angle of $S_1(t)$, varies from 0 to $+\pi/2$ and $-\phi(t)$ the angle of $S_2(t)$, varies from 0 to $-\pi/2$. Since the phase angle $\phi(t)$ is the inverse sine of the LIND input signal envelope $E(t)$, the resultant difference of the two signals $S_1(t)$ and $S_2(t)$ is an amplified replica of the input signal.

Figure 6:
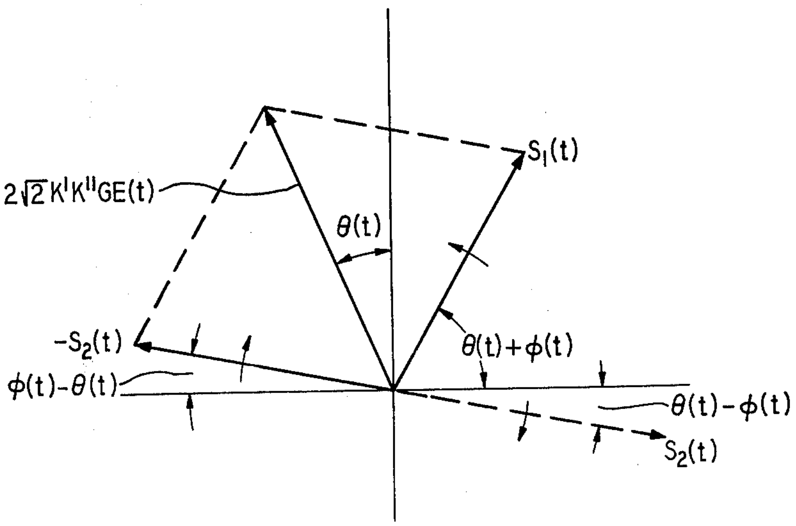

FIG. 6 is a diagram showing the phase relationship between the signals $S_1(t)$ and $S_2(t)$ when the original input signal to the LIND amplifier has both envelope $E(t)$ variations and phase $\theta(t)$ fluctuations. The phase fluctuation $\theta(t)$ is added to the phase of each signal $S_1(t)$ and $S_2(t)$. This addition causes the vector with magnitude $2\sqrt{2}\,K'K''\ GE(t)$ resulting from the subtraction of $S_2(t)$ from $S_1(t)$ to be shifted in relative phase by the angle $\theta(t)$ thus reproducing the input phase fluctuation $\theta(t)$ in the LIND amplifier output.

The LIND amplifier as described provides an input-to-output frequency offset, a useful technique in commercial information transmission systems. If the same input-to-output frequency is desired, a simple offset mixer can be used at the LIND amplifier input.

In all cases it is to be understood that the above described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. Apparatus for bandpass amplifying an input signal having amplitude and phase variations comprising:

means for producing from the input signal a constant amplitude component and a low-pass envelope signal;

means for processing the envelope signal to produce a constant amplitude signal whose phase variations are proportional to the inverse sine of the envelope signal;

means for generating a complex conjugate signal of the constant amplitude signal from the constant amplitude signal;

first means for mixing the complex conjugate signal with the constant amplitude component to produce a first mixed output;

second means for mixing the constant amplitude signal with the constant amplitude component to produce a second mixed output; and means for combining the mixed outputs to produce an amplified replica of the original input signal.

2. Apparatus as described in claim 1 wherein said means for producing a constant amplitude component and a low-pass envelope signal includes a limiter and an envelope detector.

3. Apparatus as described in claim 1 wherein said means for combining includes means for bandpass filtering the two mixed outputs and means for amplifying the filtered resultants.

4. Apparatus for bandpass amplifying an analog input signal having amplitude and phase variations comprising:

means for producing from the input signal a constant amplitude component and a low-pass envelope signal;

means for processing the envelope signal to produce a constant amplitude signal whose phase variations are proportional to the inverse sine of the envelope signal;

means for generating a complex conjugate signal of the constant amplitude signal from the constant amplitude signal;

first means for mixing the complex conjugate signal with the constant amplitude component to produce a first mixed output;

second means for mixing the constant amplitude signal with the constant amplitude component to produce a second mixed output;

means for bandpass filtering each mixed output to produce two filtered resultants;

means for amplifying each filtered resultant to produce two amplified resultants; and means for combining the two filtered resultants to produce a linearly amplified replica of the original bandpass input signal.

5. Apparatus as described in claim 1 wherein said means for processing the envelope signal is an inverse sine phase modulator comprising:

first means for applying a first reference sinusoidal signal as an input to said modulator;

second means for applying a variable amplitude envelope signal to said modulator;

first means for linearly modulating the reference input signal with the variable amplitude envelope signal to produce a first modulated output;

a summer producing a summed signal output;

means for linearly detecting the summed signal to produce a detected envelope;

second means for linearly modulating the first modulated output with the detected envelope to produce a second modulated output;

means for applying a second reference signal in phase quadrature with the second modulated output to said summer;

means for summing the second modulated output and the second reference signal to produce a summed signal which is applied to said means for linearly detecting a summed signal, said summed signal also being applied to a limiter which produces the output of the inverse sine phase modulator, said output having a phase proportional to the inverse sine of the variable amplitude envelope signal.

6. A device as described in claim 4 wherein said means for processing the envelope signal is an inverse sine phase modulator comprising:

means for applying an input envelope signal to the modulator;

a summer producing an output;

means for applying a reference signal and a modulated signal in phase quadrature to said summer;

means for limiting the output of the summer to produce a signal whose frequency is the same as the reference signal frequency but whose phase is shifted by an amount proportional to the inverse sine of the envelope signal.

7. Apparatus as described in claim 6 wherein said means for applying a reference signal and a modulated signal includes a first means for linearly modulating the reference signal with the envelope signal, a second means for linearly modulating the output of the first linear modulator with a feedback envelope signal derived from said summer output and means for phase shifting inserted between the second means for linearly modulating and said summer.

* * * * *